(12) United States Patent
Herrendoerfer (10) Patent No.: US 9,569,239 B2
(45) Date of Patent: *Feb. 14, 2017

(54) USING A MOBILE DEVICE TO TRANSFER VIRTUAL MACHINE BETWEEN COMPUTERS WHILE PRESERVING SESSION

(71) Applicant: International Business Machines Corporation, Armonk, NY (US)

(72) Inventor: Dirk Herrendoerfer, Sindelfingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,879

(22) Filed: Feb. 10, 2016

(65) Prior Publication Data

US 2016/0224361 A1 Aug. 4, 2016

Related U.S. Application Data

(63) Continuation of application No. 14/613,197, filed on Feb. 3, 2015.

(51) Int. Cl.
*G06F 9/455* (2006.01)
*H04L 29/08* (2006.01)
(Continued)

(52) U.S. Cl.
CPC ....... *G06F 9/45533* (2013.01); *G06F 9/45558* (2013.01); *G06F 17/30088* (2013.01);
(Continued)

(58) Field of Classification Search
CPC .................................................. G06F 9/45558
See application file for complete search history.

(56) References Cited

U.S. PATENT DOCUMENTS 7,093,086 B1 * 8/2006 van Rietschote ... G06F 11/1438
711/161
7,225,448 B2 5/2007 Himmel et al.
(Continued)

OTHER PUBLICATIONS

List of IBM Applications Treated as Related.

*Primary Examiner* — Benjamin Wu
*Assistant Examiner* — Jorge A Chu Joy-Davila
(74) *Attorney, Agent, or Firm* — Kunzler Law Group; Steven L. Bennett (57) ABSTRACT

A method includes loading a virtual machine snapshot of a virtual machine from a first computing device to a mobile device. The virtual machine runs on the first computing device and the virtual machine snapshot includes a COW file and an image file with files from the virtual machine. The method includes launching the virtual machine on a second computing device, where the second computing device reads the virtual machine snapshot from the mobile device and the second computing device records changes to a copy of the COW file stored on the second computing device while the second computing device runs the virtual machine. The method includes terminating a virtual machine session running on the second computing device and copying the COW file to the mobile device. The COW file includes changes to the virtual machine snapshot from execution of the virtual machine on the second computing device.

9 Claims, 5 Drawing Sheets

(51) Int. Cl.
*G06F 17/30* (2006.01)
*H04L 29/06* (2006.01)

(52) U.S. Cl.
CPC ........ *H04L 63/0428* (2013.01); *H04L 67/143* (2013.01); *H04L 67/148* (2013.01); *G06F 2009/4557* (2013.01); *G06F 2009/45562* (2013.01); *G06F 2009/45583* (2013.01)

(56) References Cited

U.S. PATENT DOCUMENTS

| | | | |
|---|---|---|---|
| 8,091,084 B1* | 1/2012 | Dobrovolskiy | G06F 9/45558 717/126 |
| 2005/0038933 A1* | 2/2005 | Himmel | G06F 9/4418 710/15 |
| 2006/0070085 A1* | 3/2006 | Bao | G06F 9/4418 719/319 |
| 2006/0288168 A1* | 12/2006 | Stevenson | G06F 9/4451 711/115 |
| 2008/0244028 A1* | 10/2008 | Le | G06F 3/0607 709/208 |
| 2010/0107163 A1* | 4/2010 | Lee | G06F 9/45533 718/1 |
| 2010/0235831 A1* | 9/2010 | Dittmer | G06F 9/45558 718/1 |
| 2013/0275973 A1 | 10/2013 | Greenfield et al. | |
| 2013/0332924 A1 | 12/2013 | Shaposhnik et al. | |
| 2014/0229940 A1* | 8/2014 | van Schaik | G06F 9/45558 718/1 |
| 2015/0067390 A1* | 3/2015 | Blake | G06F 11/1469 714/15 |

* cited by examiner

USING A MOBILE DEVICE TO TRANSFER VIRTUAL MACHINE BETWEEN COMPUTERS WHILE PRESERVING SESSION

FIELD

The subject matter disclosed herein relates to virtual machines and more particularly relates to creating a virtual machine on a second computing device from a virtual machine snapshot of a virtual machine of a first computing device stored on a mobile device.

BACKGROUND

Typically, a computing device, such as a desktop computer, a workstation, a mainframe computer, etc. is used for executing applications storing data and other typical computing tasks and the computing device is often too large to carry with a user or is not made to be portable. Even a portable computing device, such as a laptop computer, can be bulky and difficult to carry. The user may want to work in a location different than the computing device. Using an interface that allows remote access to the computing device over a network, such as the Internet, may have security issues and may suffer from network issues. In addition, using this interface is not possible when the network is unavailable.

BRIEF SUMMARY

An apparatus for transferring a virtual machine is disclosed. A method and a computer program product also perform the functions of the apparatus. The apparatus includes a VM loading module that loads a virtual machine snapshot of a virtual machine from a first computing device to a mobile device. The virtual machine runs on the first computing device and the virtual machine snapshot includes a copy-on-write ("COW") file and an image file where the image file includes files from the virtual machine. The apparatus includes a VM launch module that launches the virtual machine on a second computing device. The second computing device reads the virtual machine snapshot from the mobile device and the second computing device records changes to a copy of the COW file stored on the second computing device while the second computing device runs the virtual machine. The apparatus includes a session termination module that terminates a session of execution of the virtual machine running on the second computing device and that copies the COW file from the second computing device to the mobile device at the termination of execution of the virtual machine on the second computing device. The COW file includes changes to the virtual machine snapshot from execution of the virtual machine on the second computing device.

A method for transferring a virtual machine includes loading a virtual machine snapshot of a virtual machine from a first computing device to a mobile device. The virtual machine runs on the first computing device and the virtual machine snapshot includes a COW file and an image file where the image file includes files from the virtual machine. The method includes launching the virtual machine on a second computing device, where the second computing device reads the virtual machine snapshot from the mobile device and the second computing device records changes to a copy of the COW file stored on the second computing device while the second computing device runs the virtual machine. The method includes terminating a session of execution of the virtual machine running on the second computing device and copying the COW file from the second computing device to the mobile device at the termination of execution of the virtual machine on the second computing device. The COW file includes changes to the virtual machine snapshot from execution of the virtual machine on the second computing device.

A computer program product for transferring a virtual machine is disclosed where the computer program product includes a computer readable storage medium having program instructions embodied therewith. The program instructions are executable by a processor to cause the processor to load a virtual machine snapshot of a virtual machine from a first computing device to a mobile device. The virtual machine runs on the first computing device and the virtual machine snapshot includes a COW file and an image file where the image file includes files from the virtual machine.

The program instructions are executable by a processor to cause the processor to launch the virtual machine on a second computing device, where the second computing device reads the virtual machine snapshot from the mobile device and the second computing device records changes to a copy of the COW file stored on the second computing device while the second computing device runs the virtual machine. The program instructions are executable by a processor to cause the processor to terminate a session of execution of the virtual machine running on the second computing device and to copy the COW file from the second computing device to the mobile device at the termination of execution of the virtual machine on the second computing device. The COW file includes changes to the virtual machine snapshot from execution of the virtual machine on the second computing device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

An apparatus for transferring a virtual machine is disclosed. A method and a computer program product also perform the functions of the apparatus. The apparatus includes a VM loading module that loads a virtual machine snapshot of a virtual machine from a first computing device to a mobile device. The virtual machine runs on the first computing device and the virtual machine snapshot includes a copy-on-write ("COW") file and an image file where the image file includes files from the virtual machine. The apparatus includes a VM launch module that launches the virtual machine on a second computing device. The second computing device reads the virtual machine snapshot from the mobile device and the second computing device records changes to a copy of the COW file stored on the second computing device while the second computing device runs the virtual machine. The apparatus includes a session termination module that terminates a session of execution of the virtual machine running on the second computing device and that copies the COW file from the second computing device to the mobile device at the termination of execution of the virtual machine on the second computing device. The COW file includes changes to the virtual machine snapshot from execution of the virtual machine on the second computing device.

In one embodiment, the VM loading module also loads a hibernation file on the mobile device. The hibernation file includes screen image information, virtual machine memory contents, and/or processor and hardware state information of a session running on the first computing device. The VM launch module uses information from the hibernation file to restart, on the second computing device, the session that was running on the first computing device. In another embodiment, the session termination module also copies a hibernation file from the second computing device to the mobile device. The hibernation file includes screen image information, virtual machine memory contents, and/or processor and hardware state information of a session running on the second computing device. In the embodiment, the VM launch module also launches the virtual machine on the first computing device, where the first computing device reads the virtual machine snapshot from the mobile device after termination of the session of execution of the virtual machine on the second computing device and the first computing device records changes to a copy of the COW file stored on the first computing device while the first computing device runs the virtual machine. Also in the embodiment, the VM launch module uses information from the hibernation file to restart, on the first computing device, the session that was running on the second computing device.

In one embodiment, the virtual machine snapshot includes a copy of an operating system, applications, and data of the virtual machine. In another embodiment, the virtual machine snapshot includes the entire contents of a storage device used by the virtual machine. In another embodiment, the virtual machine snapshot includes a copy of the operating system of the virtual machine and selected applications of the virtual machine.

In one embodiment, the apparatus includes a VM creation module that creates the virtual machine on the first computing device from files accessible to the first computing device and available for execution on the first computing device outside the virtual machine. In another embodiment, the apparatus includes a sync module that merges contents of the virtual machine into files accessible to the first computing device and available for execution on the first computing device outside the virtual machine running on the first computing device. The virtual machine is started on the first computing device using information from the virtual machine snapshot received by the mobile device. In another embodiment, the apparatus includes an encryption module that encrypts at least a portion of files of the virtual machine created by the VM creation module, where the encryption module encrypts the files prior to the VM loading module loading the virtual machine snapshot to the mobile device.

In one embodiment, the mobile device comprises a processor and is capable of wireless communication. In another embodiment, the mobile device is incapable of running the virtual machine. In another embodiment, the mobile device includes an operating system different than the operating system of the virtual machine.

A method for transferring a virtual machine includes loading a virtual machine snapshot of a virtual machine from a first computing device to a mobile device. The virtual machine runs on the first computing device and the virtual machine snapshot includes a COW file and an image file where the image file includes files from the virtual machine. The method includes launching the virtual machine on a second computing device, where the second computing device reads the virtual machine snapshot from the mobile device and the second computing device records changes to a copy of the COW file stored on the second computing device while the second computing device runs the virtual machine. The method includes terminating a session of execution of the virtual machine running on the second computing device and copying the COW file from the second computing device to the mobile device at the termination of execution of the virtual machine on the second computing device. The COW file includes changes to the virtual machine snapshot from execution of the virtual machine on the second computing device.

In one embodiment, loading a virtual machine snapshot of the virtual machine also includes loading a hibernation file on the mobile device, where the hibernation file includes screen image information, virtual machine memory contents, and/or processor and hardware state information of a session running on the first computing device. Launching the virtual machine on the second computing device also includes using information from the hibernation file to restart, on the second computing device, the session that was running on the first computing device.

In another embodiment, terminating of the session running on the second computing device also includes copying a hibernation file from the second computing device to the mobile device, where the hibernation file includes screen image information, virtual machine memory contents, and/or processor and hardware state information of a session running on the second computing device. In the embodiment, the method includes launching the virtual machine on the first computing device, where the first computing device reads the virtual machine snapshot from the mobile device after termination of the session of execution of the virtual machine on the second computing device and the first computing device records changes to a copy of the COW file stored on the first computing device while the first computing device runs the virtual machine. Launching the virtual machine on the first computing device includes using information from the hibernation file to restart, on the first computing device, the session that was running on the second computing device.

In one embodiment, the method includes creating the virtual machine on the first computing device from files accessible to the first computing device and available for execution on the first computing device outside the virtual machine. In another embodiment, the method includes merging contents of the virtual machine into files accessible to the first computing device and available for execution on the first computing device outside the virtual machine running on the first computing device. The virtual machine is started on the first computing device using information from the virtual machine snapshot received by the mobile device.

A computer program product for transferring a virtual machine is disclosed where the computer program product includes a computer readable storage medium having program instructions embodied therewith. The program instructions are executable by a processor to cause the processor to load a virtual machine snapshot of a virtual machine from a first computing device to a mobile device. The virtual machine runs on the first computing device and the virtual machine snapshot includes a COW file and an image file where the image file includes files from the virtual machine.

The program instructions are executable by a processor to cause the processor to launch the virtual machine on a second computing device, where the second computing device reads the virtual machine snapshot from the mobile device and the second computing device records changes to a copy of the COW file stored on the second computing device while the second computing device runs the virtual machine. The program instructions are executable by a processor to cause the processor to terminate a session of execution of the virtual machine running on the second computing device and to copy the COW file from the second computing device to the mobile device at the termination of execution of the virtual machine on the second computing device. The COW file includes changes to the virtual machine snapshot from execution of the virtual machine on the second computing device.

In one embodiment, the program instructions further cause the processor to load a hibernation file on the mobile device, where the hibernation file includes screen image information, virtual machine memory contents, and/or processor and hardware state information of a session running on the first computing device, and to use information from the hibernation file to restart, on the second computing device, the session that was running on the first computing device.

In another embodiment, the program instructions further causing the processor to copy a hibernation file from the second computing device to the mobile device, where the hibernation file includes screen image information, virtual machine memory contents, and/or processor and hardware state information of a session running on the second computing device, and to launch the virtual machine on the first computing device, where the first computing device reads the virtual machine snapshot from the mobile device after termination of the session of execution of the virtual machine on the second computing device and the first computing device records changes to a copy of the COW file stored on the first computing device while the first computing device runs the virtual machine. Launching the virtual machine on the first computing device includes using information from the hibernation file to restart, on the first computing device, the session that was running on the second computing device.

Figure 1:
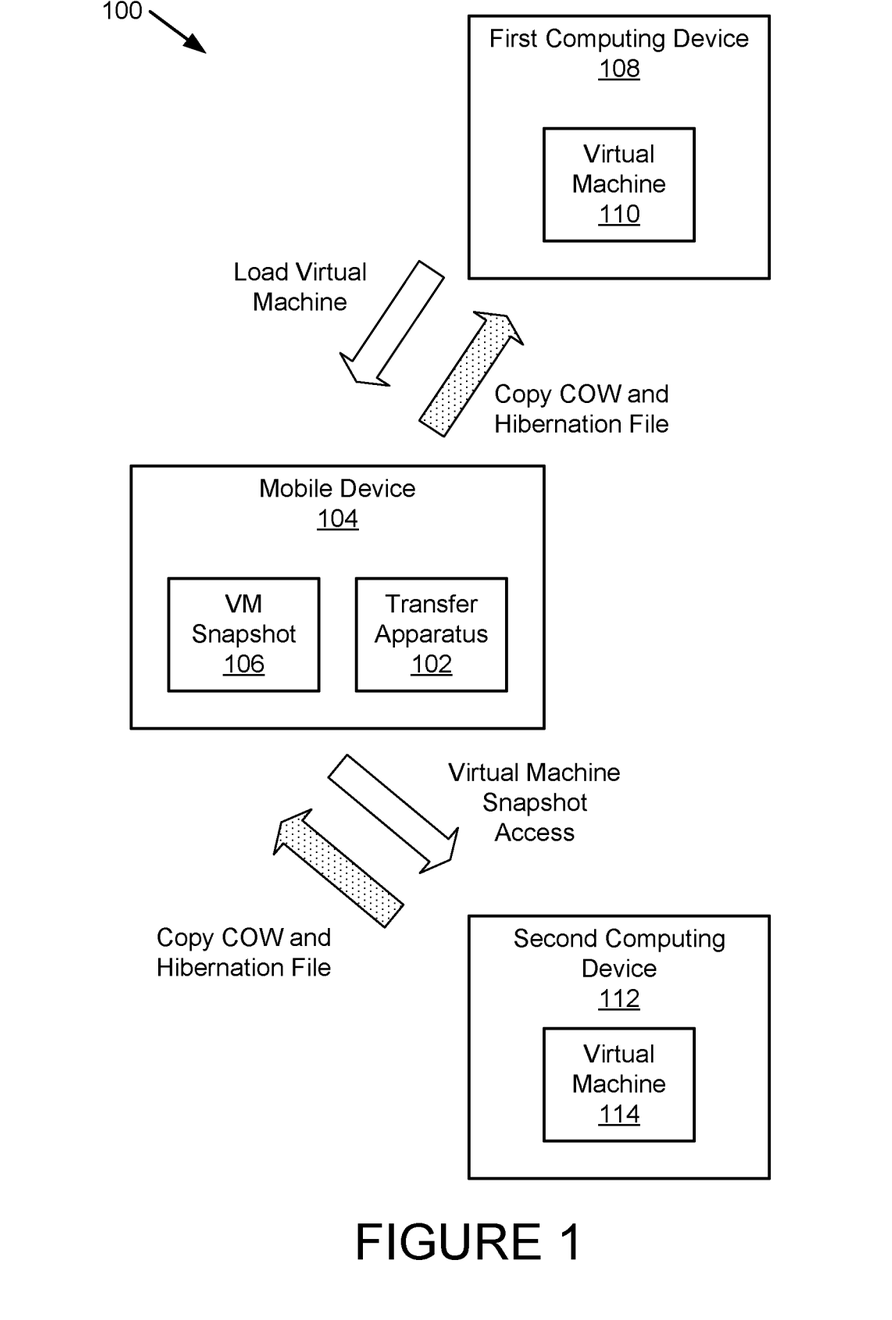
FIG. 1 is a schematic block diagram illustrating one embodiment of a system for transferring a virtual machine in accordance with one embodiment of the present invention.

FIG. 1 is a schematic block diagram illustrating one embodiment of a system 100 for transferring a virtual machine in accordance with one embodiment of the present invention. The system 100 includes a transfer apparatus 102 on a mobile device 104 along with a virtual machine ("VM") snapshot 106, a first computing device 108 with a virtual machine 110, and a second computing device 112 with another virtual machine 114, which are described below.

In one embodiment, the system 100 includes a transfer apparatus 102. In the embodiment depicted, the transfer apparatus 102 is shown in the mobile device 104, but all or a portion of the transfer apparatus 102 may be located elsewhere. For example, a portion of the transfer apparatus 102 may be located on the first computing device 108, the second computing device 112, and/or in some other location. In general, the transfer apparatus 102 facilitates transferring a virtual machine 110 from the first computing device 108 to the mobile device 104 and then facilitates launching a virtual machine 114 on the second computing device 112 using a virtual machine snapshot 106. Then the transfer apparatus 102 facilitates termination of a session of the virtual machine on the second computing device 112 and copying a copy-on-write ("COW") file back to the mobile device 104 and possibly copying a hibernations file back to the mobile device 104. The virtual machine snapshot 106 with the COW and possibly the hibernation file may be used to re-launch the virtual machine 110 on the first computing device 108. The transfer apparatus 102 allows a user to encrypt data on the virtual machine 110 and then resume work on another machine without taking a larger device, such as a laptop, and allows a session to be hibernated and then the session resumed on another computer. The transfer apparatus 102 will be discussed in more detail with regard to the apparatuses 200, 300 of FIGS. 2 and 3.

In one embodiment, the system 100 includes a mobile device 104 that is used to store and transport a virtual machine snapshot 106. The mobile device 104, in one embodiment, includes a processor and an operating system. For example, the mobile device 104 may be a cellular phone, a portable music player, a portable gaming device, a tablet or other device generally used for purposes other than mere electronic file storage. In another embodiment, the transfer apparatus 102 may store a virtual machine snapshot 106 on a storage device, such as a flash memory device, an optical drive, a portable hard disk drive or other storage formatted to store a virtual machine snapshot 106. The storage device may be called a mobile device 104 and is typically a device that may be used to connect to a computing device to allow a user to move electronic files to the storage device without the storage device becoming part of the virtual machine. The storage device may be independent of electronic storage used to operate a computing device. One of skill in the art will recognize the difference between a storage device that is integral to a computing device or virtual machine on the computing device and may include an operating system of the computing device or virtual machine and a storage device that is quickly connected for transferring electronic files so that the storage device may be disconnected for transporting.

The mobile device 104, in one embodiment, includes an operating system different than the first computing device 108 and second computing device 112. For example, the mobile device 104 may have an operating system typical of a smartphone or other portable electronic device, such as iOS, Android™, etc. while the first computing device 108 and second computing device 112 may have another operating system, such as Linux®, AIX®, HP-UX®, Windows®, etc. In another embodiment, the first computing device 108 and second computing device 112 may run a virtual machine 110, 114 while the mobile device 104 may be incapable of running a virtual machine 110, 114 and may be used for storage and transportation of the virtual machine snapshot 106.

The virtual machine snapshot 106, in one embodiment, includes files copied from a virtual machine (e.g. 110) and used to launch a virtual machine on a different computing device. In one example, the virtual machine snapshot 106 also includes one or more files used to resume a session of a virtual machine on a different computing device that was hibernated on another computing device. The one or more files used to resume a session of a virtual machine may include screen image information, memory contents, processor and hardware states, etc. and may enable a user to have the same screen, the same applications opened, etc. so that a session of the virtual machine 110 on the first computing device 108 is resumed with a virtual machine 114 on the second computing device 112 at the same point where the session was hibernated. The one or more files used to resume a session of a virtual machine are referred to hereinafter as a hibernation file. However, one of skill in the art will recognize that the hibernation file may include multiple files. In one embodiment, a hibernation file is not included in the virtual machine snapshot 106. For example, a user may shut down an instance of a virtual machine (e.g. 110, 114) so that a hibernation file is not part of the virtual machine snapshot 106. In another embodiment, the hibernation file includes information regarding a shutdown or information from hibernation, depending on whether or not a user shuts down or hibernates an instance of the virtual machine (e.g. 110, 114).

The virtual machine snapshot 106 may also include a copy-on-write ("COW") file. The virtual machine 110 on the first computing device 108 may be configured to include an image file and a COW file that includes changes to the image file. The image file may include a set of files of the virtual machine 110. For example, if a data file is changed while the virtual machine 110 is in operation, changes to the data file may be included in the COW file while the data file remains unchanged. In one embodiment, when the virtual machine snapshot 106 is generated, the image file may include any changes based on operation of the virtual machine 110 and the COW file may be empty or may include header information and a structure but may not include any changes. Subsequent changes while running the virtual machine 114 on the second computing device 112 or other computing device may be recorded in the COW file.

In one embodiment, the virtual machine snapshot 106 includes an operating system along with application files and data files of the virtual machine 110 on the first computing device 108. For example, the virtual machine snapshot 106 may be a complete copy of the virtual machine 110 running on the first computing device 108, or the entire contents of a storage device used by the virtual machine 110. In another embodiment, the virtual machine snapshot 106 includes a partial copy of the virtual machine 110. For example, a user interface may allow a user to select certain applications and associated data while other applications and data of the virtual machine 110 are not included in virtual machine snapshot 106. In one embodiment, where there is a partial set of application files, the operating system of the virtual machine snapshot 106 is complete or is in a state capable of operation without other operating system files. In another embodiment, the virtual machine snapshot 106 may include a partial operating system that may not include all files from the operating system of the virtual machine 110, but includes enough operating system files to run independent of other operating system files on another device. The reduced virtual machine snapshot 106 may be advantageous to reduce a size of the virtual machine snapshot 106.

The system 100 includes a first computing device 108 and a second computing device 112. The first computing device 108 or the second computing device 112 may be a laptop, a desktop computer, a workstation, a mainframe, a tablet or other computing device with a processor capable of running a virtual machine (e.g. 110, 114). Typically, the first computing device 108 and the second computing device 112 are separated by a distance, are on separate networks, or have some other factor that makes transfer of a virtual machine snapshot 106 to a mobile device 104 useful. For example, the first computing device 108 may be at a work location of a user while the second computing device 112 may be at the home of the user or at some other location where the user wants to work. While a first computing device 108 and a second computing device 112 are depicted in the system 100 of FIG. 1, embodiments of the invention described herein may be used on additional computing devices. For example, the user may use the transfer apparatus 102 to launch a virtual machine on numerous computing devices where session information is stored in a hibernation file in the virtual machine snapshot 106 at each location and a COW file is updated and stored back to the mobile device 104 when a session is terminated.

Figure 2:
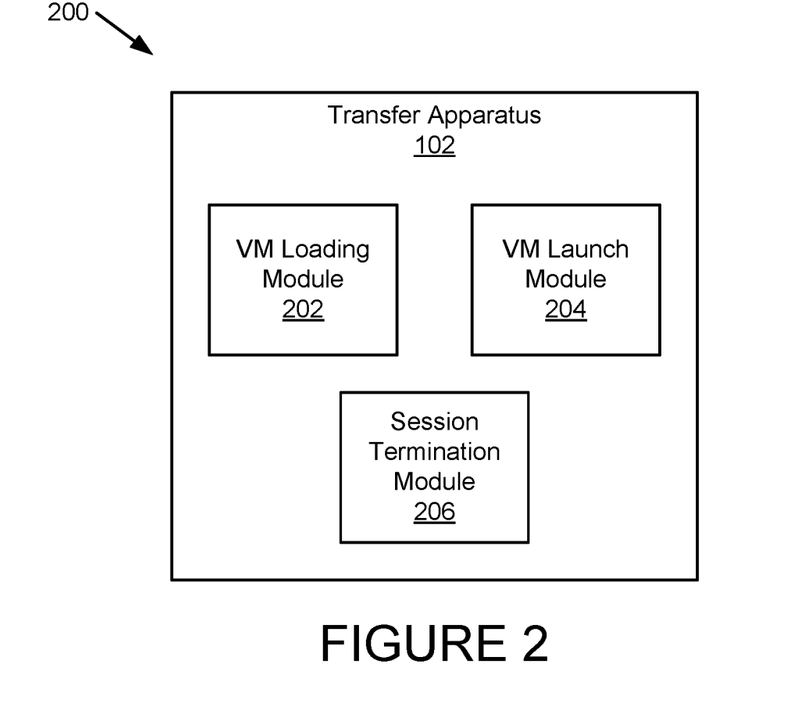
FIG. 2 is a schematic block diagram illustrating one embodiment of an apparatus for transferring a virtual machine in accordance with one embodiment of the present invention.

FIG. 2 is a schematic block diagram illustrating one embodiment of an apparatus 200 for transferring a virtual machine in accordance with one embodiment of the present invention. The apparatus 200 includes one embodiment of the transfer apparatus 102 with a VM loading module 202, a VM launch module 204, and a session termination module 206, which are described below.

The apparatus 200, in one embodiment, includes a VM loading module 202 that loads a snapshot of a virtual machine (e.g. virtual machine snapshot 106) from a first computing device 108 to a mobile device 104. The virtual machine 110 is running on the first computing device 108 and the snapshot includes a COW file and an image file. The image file includes files from the virtual machine 110. For example, a user may pick a point in time to create a virtual machine snapshot 106 from the virtual machine 110. In one embodiment, the VM loading module 202 includes creating the virtual machine snapshot 106 as well as loading the virtual machine snapshot 106 to the mobile device 104. As discussed above, the virtual machine snapshot 106 may include a copy of the entire virtual machine 110 or a subset of the virtual machine 110. The VM loading module 202 may load the virtual machine snapshot 106 onto the mobile device 104 over a universal serial bus ("USB") connection, a secure digital ("SD") card, a wireless connection or other data connection between the first computing device 108 and mobile device 104. The data connection may be a direct connection or may be over a computer network.

In one embodiment, the VM loading module 202 copies the virtual machine snapshot 106 to a location in non-volatile memory of the mobile device 104. In another embodiment, all or part of the virtual machine snapshot 106 is loaded into volatile memory of the mobile device 104. In another embodiment, the VM loading module 202 provides a user interface that allows the user to select a location on the mobile device 104 for transfer or allows other options during the loading process, such as naming of the virtual machine snapshot 106. In one embodiment, the VM loading module 202 resides on the first computing device 108. In another embodiment, the VM loading module 202 resides on the mobile device 104. In another embodiment, a portion of the VM loading module 202 resides on the first computing device 108 and a portion resides on the mobile device 104.

In one embodiment, the apparatus 200 includes a VM launch module 204 that launches the virtual machine 114 on a second computing device 112. The second computing device 112 reads the virtual machine snapshot 106 from the mobile device 104 and the second computing device 112 records changes to a copy of the COW file stored on the second computing device 112 while the second computing device 112 runs the virtual machine 114. Typically reading data on a data storage device is quicker than writing data to a data storage device. For example, reading the virtual machine snapshot 106 in data storage on the mobile device 104 may be faster than writing to the data storage of the mobile device 104.

The VM launch module 204 may set up the virtual machine 114 on the second computing device 112 to read the virtual machine snapshot 106 on the mobile device 104 and write to a copy of the COW file that is stored on the second computing device 112. Typically, reading from the mobile device 104 and writing to the COW file is faster than read/write operations on files on the mobile device 104. The VM launch module 204 may set read and write locations for the virtual machine 114 and may select an option where the virtual machine 114 stores changes in the COW file. Having the virtual machine 114 on the second computing device 112 read from the virtual machine snapshot 106 on the mobile device 104 while writing to a COW file typically allows the virtual machine 114 on the second computing device 112 to start quicker than copying the entire virtual machine snapshot 106 due to the potential size of the virtual machine snapshot 106. One of skill in the art will recognize other advantages of the VM launch module 204 setting up the virtual machine 114 on the second computing device 112 to read from the virtual machine snapshot 106 and writing to the COW file.

The apparatus 200, in one embodiment, includes a session termination module 206 that terminates a session of execution of the virtual machine 114 running on the second computing device 112 and that copies the COW file from the second computing device 112 to the mobile device 104 at the termination of execution of the virtual machine 114 on the second computing device 112. The COW file includes changes to the virtual machine snapshot 106 from execution of the virtual machine 114 on the second computing device 112. In one embodiment, the session termination module 206 suspends operation of the virtual machine 114 and saves state data, screen information, etc. in a hibernation file. In another embodiment, the user may shut down the virtual machine 114 and the session termination module 206 may store shutdown information in the virtual machine snapshot 106. In one embodiment, the session termination module 206 records information in the virtual machine snapshot 106 sufficient for the VM launch module 204 to re-launch the virtual machine (e.g. 110) on the first computing device 108 or another computing device. Note that copying the COW file back to the mobile device 104 is typically quicker than if an entire image file is copied to the mobile device 104 along with a COW file and possibly a hibernation file.

In one embodiment, the VM loading module 202 also loads a hibernation file on the mobile device 104. The hibernation file may include screen image information, virtual machine memory contents, processor and hardware state information, etc. of a session running on the first computing device 108 and the VM launch module 204 uses information from the hibernation file to restart, on the second computing device 112, the session that was running on the first computing device 108. For example, a user may want to hibernate a session of the virtual machine 110 running on the first computing device 108 and then resume the session on the second computing device 112 so the hibernation file may include information to resume the session at a same point on the second computing device 112.

In another embodiment, the session termination module 206 copies a hibernation file from the second computing device 112 to the mobile device 104. The hibernation file includes screen image information, virtual machine memory contents, processor and hardware state information, etc. of a session running on the second computing device 112. The VM launch module 204 may then launch the virtual machine 114 that was running on the second computing device 112 on the first computing device 108. The first computing device 108 reads the virtual machine snapshot 106 from the mobile device 104 after termination of the session of execution of the virtual machine 114 on the second computing device 112 and the first computing device 108 records changes to a copy of the COW file stored on the first computing device 108 while the first computing device 108 runs the virtual machine 110. The VM launch module 204 uses information from the hibernation file to restart, on the first computing device 108, the session that was running on the second computing device 112. Thus a user can resume on the first computing device 108 a session of the virtual machine 114 running on the second computing device 112 at a same point of termination at the second computing device 112.

Figure 3:
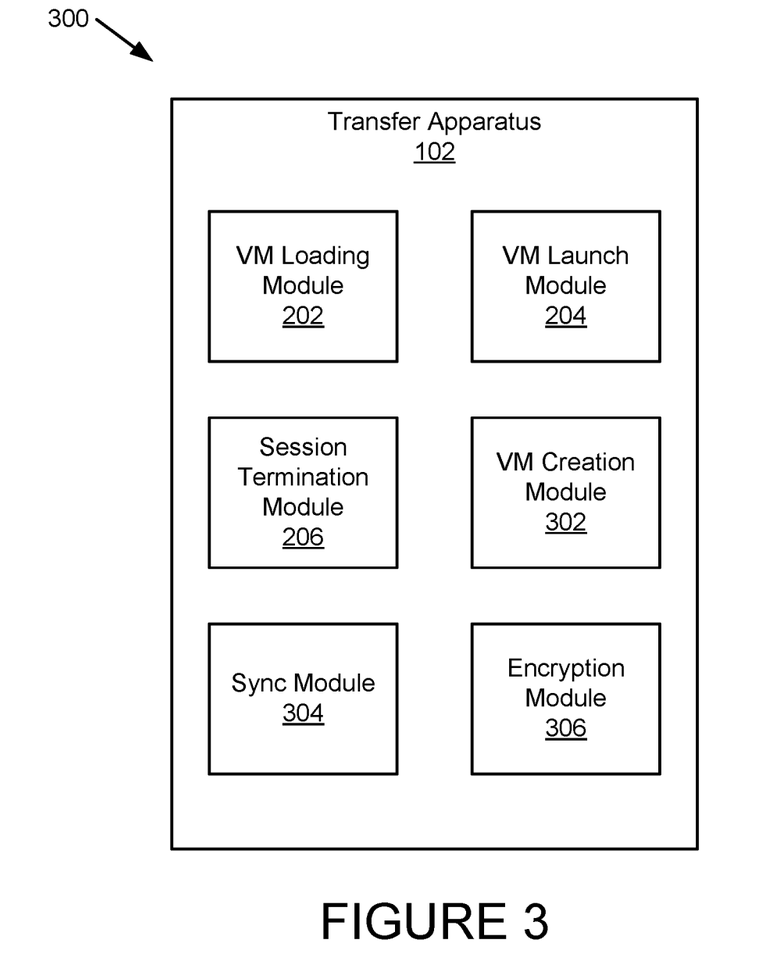
FIG. 3 is a schematic block diagram illustrating one embodiment of another apparatus for transferring a virtual machine in accordance with one embodiment of the present invention.

FIG. 3 is a schematic block diagram illustrating one embodiment of another apparatus 300 for transferring a virtual machine in accordance with one embodiment of the present invention. The apparatus 300 includes another embodiment of the transfer apparatus 102 with a VM loading module 202, a VM launch module 204, and a session termination module 206, which are substantially similar to those described above in relation to the apparatus 200 of FIG. 2. In various embodiments, the apparatus 300 includes one or more of a VM creation module 302, a sync module 304, and an encryption module 306, which are described below.

In one embodiment, the apparatus 300 includes VM creation module 302 that creates the virtual machine 110 on the first computing device 108 from files accessible to the first computing device 108 and available for execution on the first computing device 108 outside the virtual machine 110. For example, a user may be operating the first computing device 108 without a virtual machine 110 and the VM creation module 302 may create a virtual machine 110 to then create the virtual machine snapshot 106. In another embodiment, the VM creation module 302 and the VM loading module 202 cooperate or are combined to create the virtual machine 110 and the virtual machine snapshot 106. In one embodiment, the VM creation module 302 includes an interface to allow the user to control at least some elements of creation of the virtual machine 110. For example, the VM creation module 302 may allow a user to include certain applications, data files, etc. in the virtual machine 110. One of skill in the art will recognize other ways for the VM creation module 302 to create the virtual machine 110 on the first computing device 108 and will recognize other options that may be available to a user while creating the virtual machine 110.

The apparatus 300, in one embodiment, includes a sync module 304 that merges contents of the virtual machine 110 into files accessible to the first computing device 108 and available for execution on the first computing device 108 outside the virtual machine 110 running on the first computing device 108. In one embodiment, the virtual machine 110 is started on the first computing device 108 using information from the virtual machine snapshot 106 received by the mobile device 104. The sync module 304 may use the latest version of the COW file to make changes to data files, application files, etc. on the first computing device 108 outside the virtual machine 110. The sync module 304 may use timestamp information, memory state information, etc. to merge contents of the virtual machine 110 back into the files of the first computing device 108 outside the virtual machine 110.

In another embodiment, the user may choose to continue use of the virtual machine 110 on the first computing device 108 and then using the session termination module 206, VM loading module 202 and VM launching module 204 for moving between the first computing device 108 and the second computing device 112. There are typically tradeoffs between using the sync module 304 and continued use of the virtual machine 110 on the first computing device 108. For example, using the virtual machine 110 on the first computing device 108 may reduce operating speed of the virtual machine 110 when compared to operating without a virtual machine 110. On the other hand, continued use of the virtual machine 110 on the first computing device 108 may be more convenient than using the sync module 304. In another embodiment, the COW file may grow in size and occasionally using the sync module 304 may allow the COW file to be reset. For example, the sync module 304 may merge contents of the COW file and other files onto the first computing device 108 and the VM creation module 302 may create a new virtual machine 110 with a COW file that is reset with no data changes.

The apparatus 300, in one embodiment, includes an encryption module 306 that encrypts at least a portion of files of the virtual machine 110 created by the VM creation module 302, where the encryption module 306 encrypts the files prior to the VM loading module 202 loading the virtual machine snapshot 106 to the mobile device 104. For example, many employers require files to be encrypted, especially when taken off premises. The encryption module 306, in one embodiment, encrypts some or all files of the virtual machine 110 where the virtual machine snapshot 106 is then not encrypted before the VM loading module 202 copies the virtual machine snapshot 106 to the mobile device 104. Encrypting files on the virtual machine 110 may allow data protection while not having to encrypt the virtual machine snapshot 106.

Figure 4:
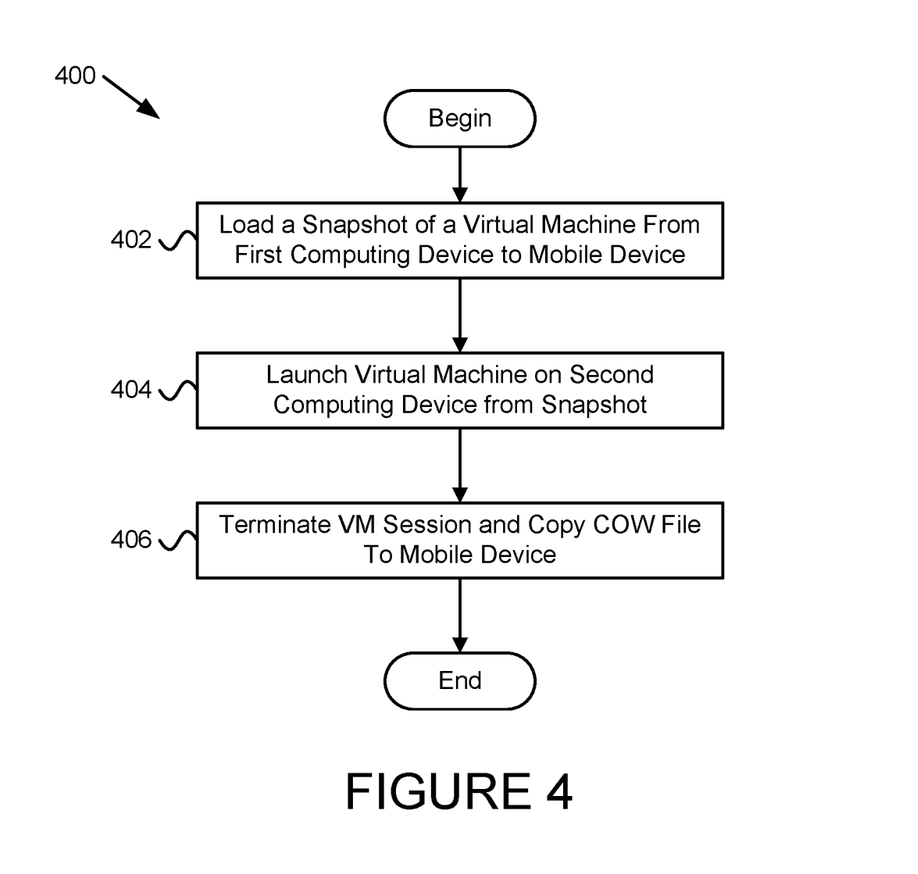
FIG. 4 is a schematic flow chart diagram illustrating one embodiment of a method for transferring a virtual machine in accordance with one embodiment of the present invention.

FIG. 4 is a schematic flow chart diagram illustrating one embodiment of a method 400 for transferring a virtual machine in accordance with one embodiment of the present invention. The method 400 begins and loads 402 a virtual machine snapshot 106 of a virtual machine 110 from a first computing device 108 to a mobile device 104. The virtual machine 110 runs on the first computing device 108 and the virtual machine snapshot 106 includes COW file and an image file where the image file includes files from the virtual machine 110. In one embodiment, the VM loading module 202 loads 402 the virtual machine snapshot 106.

The method 400 launches 404 the virtual machine 114 on a second computing device 112. The second computing device 112 reads the virtual machine snapshot 106 from the mobile device 104 and the second computing device 112 records changes to a copy of the COW file stored on the second computing device 112 while the second computing device 112 runs the virtual machine 114. In one embodiment, the VM launch module 204 launches 404 the virtual machine 114 on the second computing device 112. The method 400 terminates 406 a session of execution of the virtual machine 114 running on the second computing device 112 and copies the COW file from the second computing device 112 to the mobile device 104 at the termination of execution of the virtual machine 114 on the second computing device 112. The COW file includes changes to the virtual machine snapshot 106 from execution of the virtual machine 114 on the second computing device 112, and the method 400 ends. In one embodiment, the session termination module 206 terminates 406 the session of execution of the virtual machine 114 running on the second computing device 112.

Figure 5:
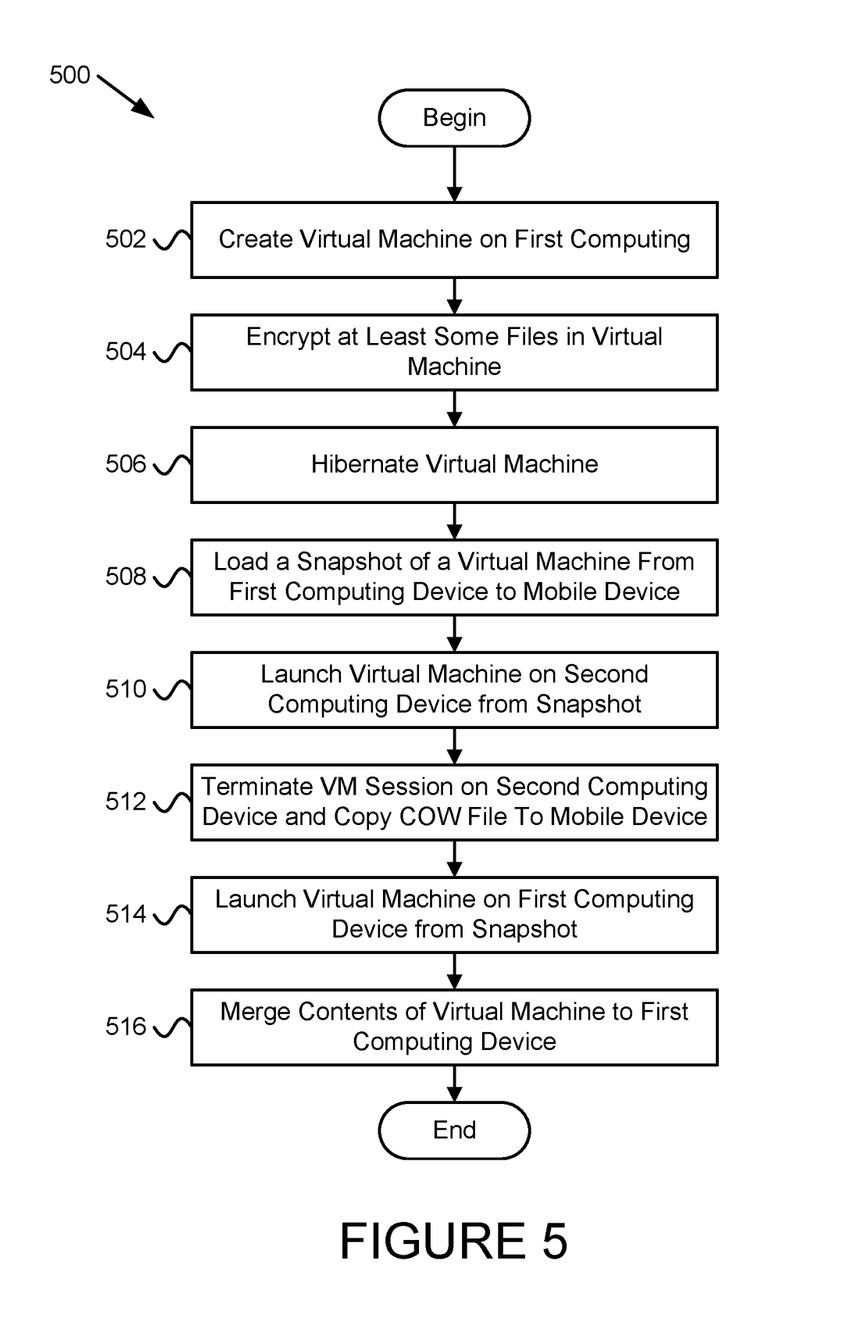
FIG. 5 is a schematic flow chart diagram illustrating another embodiment of a method for transferring a virtual machine in accordance with one embodiment of the present invention.

FIG. 5 is a schematic flow chart diagram illustrating another embodiment of a method 500 for transferring a virtual machine in accordance with one embodiment of the present invention. The method 500 begins and creates 502 a virtual machine 110 on a first computing device 108 from files accessible to the first computing device 108 and available for execution on the first computing device 108 outside the virtual machine 110. In one example, the VM creation module 302 creates 502 the virtual machine 110 on the first computing device 108. In one embodiment, the method 500 optionally encrypts 504 at least a portion of files of the virtual machine 110 created on the first computing device 108. The method 500 encrypts the files prior to the loading 508 the virtual machine snapshot 106 to the mobile device 104. In one instance, the encryption module 306 encrypts 504 the files of the virtual machine 110.

In one example, the method 500 hibernates 506 the virtual machine 110 and loads 508 a virtual machine snapshot 106 of a virtual machine 110 from the first computing device 108 to a mobile device 104. In one embodiment, the method 500 creates a hibernation file and loads the hibernation file to the mobile device 104. In another embodiment, the virtual machine 110 may be created to create a virtual machine snapshot 106 and the method 500 may not need to hibernate the virtual machine 110. The virtual machine snapshot 106 includes COW file and an image file where the image file includes files from the virtual machine 110. In another embodiment, the hibernation file is part of the virtual machine snapshot 106. In one embodiment, the VM loading module 202 hibernates 506 the virtual machine 110 and/or loads 508 the virtual machine snapshot 106.

The method 500 launches 510 the virtual machine 114 on a second computing device 112. The second computing device 112 reads the virtual machine snapshot 106 from the mobile device 104 and the second computing device 112 records changes to a copy of the COW file stored on the second computing device 112 while the second computing device 112 runs the virtual machine 114. In one embodiment, the VM launch module 204 launches 510 the virtual machine 114 on the second computing device 112. The method 500 terminates 512 a session of execution of the virtual machine 114 running on the second computing device 112 and copies the COW file from the second computing device 112 to the mobile device 104 at the termination of execution of the virtual machine 114 on the second computing device 112. In one embodiment, terminating 512 the session on the second computing device 112 includes hibernating the session and a hibernation file is copied to the mobile device 104. The COW file includes changes to the virtual machine snapshot 106 from execution of the virtual machine 114 on the second computing device 112, and the method 400 ends. In one embodiment, the session termination module 206 terminates 512 the session of execution of the virtual machine 114 running on the second computing device 112.

The method 500 launches 514 the virtual machine 110 on the first computing device 108. In one embodiment, the first computing device 108 reads the virtual machine snapshot 106 from the mobile device 104 and the first computing device 108 records changes to a copy of the COW file stored on the first computing device 108 while the first computing device 108 runs the virtual machine 114. In another embodiment, the first computing device 108 reads either the virtual machine snapshot 106 on the first computing device 108 or files from left from a previous session of the virtual machine 110 that are stored on a storage device associated with the virtual machine 110 on the first computing device 108. The VM launch module 204 may launch 514 the virtual machine 110 on the first computing device 108. The method 500 merges 516 contents of the virtual machine 110 into files accessible to the first computing device 108 and available for execution on the first computing device 108 outside the virtual machine 110 running on the first computing device 108, and the method 500 ends. The sync module 304 may merge 516 contents of the virtual machine 110 on the first computing device 108.

In another embodiment (not shown), instead of merging 516 contents of the virtual machine 110 on the first computing device 108, the method 500 terminates the session of execution of the virtual machine 110 running on the first computing device 108 and copies the COW file from the first computing device 108 to the mobile device 104 at the termination of execution of the virtual machine 110 on the first computing device 108. Terminating the session of execution of the virtual machine 110 on the first computing device 108 may include hibernating the session and creating a hibernation file and the method 500 copies the hibernation file to the mobile device 104. The mobile device 104 may then be ready to launch a virtual machine on a computing device.

The method 500 may continue between launching various sessions of a virtual machine and then terminating the virtual machine and copying a latest COW file to the mobile device 104 and possibly a hibernation file. In one embodiment, the COW file continues to grow so the method 500 may merge 516 contents of the virtual machine 110 back to the first computing device 108. The method 500 may then begin again by creating a new virtual machine 110 and proceed as depicted in FIG. 5 or the method may cycle between launching virtual machines and terminating sessions of a virtual machine. One of skill in the art will recognize other variations of execution of the method 500 of FIG. 5.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

loading a virtual machine snapshot of a virtual machine from a first computing device to a mobile device, the virtual machine running on the first computing device, the virtual machine snapshot comprising a copy-on-write ("COW") file, an image file, and a hibernation file, the image file comprising files from the virtual machine, the hibernation file comprising one or more of virtual machine memory contents and processor and hardware state information of a session running on the first computing device;

launching the virtual machine on a second computing device, wherein the second computing device reads the virtual machine snapshot from the mobile device and wherein the second computing device records changes to a copy of the COW file stored on the second computing device while the second computing device runs the virtual machine, and wherein information from the hibernation file is used to restart, on the second computing device, the session that was running on the first computing device;

terminating a session of execution of the virtual machine running on the second computing device and copying the COW file from the second computing device to the mobile device at the termination of execution of the virtual machine on the second computing device by merging changes into an existing COW file on the mobile device, the COW file comprising changes to the virtual machine snapshot from execution of the virtual machine on the second computing device;

merging contents of the virtual machine and the COW file into files accessible to the first computing device, and available for execution on the first computing device outside the virtual machine running on the first computing device based on one or more of timestamp information and memory state information, the virtual machine started on the first computing device using information from the virtual machine snapshot received by the mobile device;

resetting the COW file upon reaching a predefined size of the COW file in response to the contents of the COW file being merged into files accessible to the first computing device outside the virtual machine; and creating a new virtual machine snapshot of the virtual machine with the reset COW file, wherein the mobile device comprises an operating system different than the operating system of the virtual machine, the operating system of the first computing device, and the operating system of the second computing device.

2. The method of claim 1, wherein terminating of the session running on the second computing device further comprises copying a hibernation file from the second computing device to the mobile device, the hibernation file comprising one or more of screen image information, virtual machine memory contents, and processor and hardware state information of a session running on the second computing device, and further comprising launching the virtual machine on the first computing device, wherein the first computing device reads the virtual machine snapshot from the mobile device after termination of the session of execution of the virtual machine on the second computing device and wherein the first computing device records changes to a copy of the COW file stored on the first computing device while the first computing device runs the virtual machine, launching the virtual machine on the first computing device comprising using information from the hibernation file to restart, on the first computing device, the session that was running on the second computing device.

3. The method of claim 1, wherein the virtual machine snapshot comprises a copy of an operating system, applications, and data of the virtual machine.

4. The method of claim 3, wherein the virtual machine snapshot comprises the entire contents of a storage device used by the virtual machine.

5. The method of claim 3, wherein the virtual machine snapshot comprises a copy of the operating system of the virtual machine and selected applications of the virtual machine.

6. The method of claim 1, further comprising creating the virtual machine on the first computing device from files accessible to the first computing device and available for execution on the first computing device outside the virtual machine.

7. The method of claim 6, further comprising encrypting at least a portion of files of the virtual machine prior to loading the virtual machine snapshot to the mobile device.

8. The method of claim 1, wherein the mobile device comprises a processor and is capable of wireless communication.

9. The method of claim 1, wherein the mobile device is incapable of running the virtual machine.

* * * * *